United States Patent
Nakamura (10) Patent No.: US 9,409,338 B2
(45) Date of Patent: Aug. 9, 2016

(54) APPARATUS AND METHOD FOR MANUFACTURING RAW RUBBER STRIP

(71) Applicant: SUMITOMO RUBBER INDUSTRIES, LTD., Kobe-shi, Hyogo (JP)

(72) Inventor: Yoshinobu Nakamura, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/858,292

(22) Filed: Sep. 18, 2015

(65) Prior Publication Data

US 2016/0009012 A1  Jan. 14, 2016

Related U.S. Application Data

(62) Division of application No. 13/437,218, filed on Apr. 2, 2012, now abandoned.

(30) Foreign Application Priority Data

Jun. 7, 2011 (JP) .................................. 2011-127573

(51) Int. Cl.
*B29C 47/24* (2006.01)
*B29C 47/08* (2006.01)
(Continued)

(52) U.S. Cl.
CPC ........... *B29C 47/0813* (2013.01); *B29C 43/222* (2013.01); *B29C 43/24* (2013.01); *B29C 43/245* (2013.01); *B29C 47/004* (2013.01); *B29C 47/0021* (2013.01); *B29C 47/0806* (2013.01); *B29C 47/0876* (2013.01); *B29C 47/34* (2013.01); *B29C 47/364* (2013.01); *B29C 47/367* (2013.01); *B29C 47/385* (2013.01); *B29C 47/92* (2013.01); *B29D 30/30* (2013.01); *B29C 47/0019* (2013.01);
(Continued)

(58) Field of Classification Search
CPC .... B29C 43/245; B29C 43/222; B29C 43/24; B29C 47/0813; B29C 47/385; B29C 47/0021; B29C 47/34; B29C 47/92; B29C 47/0876; B29C 47/004; B29C 47/367; B29C 47/0806; B29C 47/364; B29C 47/0019; B29C 2947/9259; B29C 2947/92647; B29C 2947/92923; B29C 2947/92961; B29C 2947/92876; B29D 30/30; B29K 2021/00; B29L 2030/00
See application file for complete search history.

(56) References Cited

U.S. PATENT DOCUMENTS 3,135,018 A * 6/1964 Smith ................... B29C 47/92
                                                                425/141
4,858,139 A * 8/1989 Wirtz .................. B29C 47/0021
                                                                100/168
2005/0224159 A1  10/2005 Suda et al.

FOREIGN PATENT DOCUMENTS

JP  2004-202750 A  7/2004
JP  2004-237715 A  8/2004
(Continued)

*Primary Examiner* — Galen Hauth
(74) *Attorney, Agent, or Firm* — Birch, Stewart, Kolasch & Birch, LLP (57) ABSTRACT

An apparatus for intermittently manufacturing a raw rubber strip comprises a screw extruder, an extruder head having a preforming nozzle, a gear pump therebetween, a pair of calendar rolls, a roll-gap changer for switching between a close state and an open state of calendar rolls, and a controller for controlling the gear pump, the calendar rolls and the roll-gap changer to let the calendar rolls in the open state prior to the stopping of the rotation of the calendar rolls.

6 Claims, 5 Drawing Sheets

(51) Int. Cl.
  *B29C 43/24* (2006.01)
  *B29C 47/00* (2006.01)
  *B29C 47/34* (2006.01)
  *B29C 47/36* (2006.01)
  *B29C 47/92* (2006.01)
  *B29D 30/30* (2006.01)
  *B29C 43/22* (2006.01)
  *B29C 47/38* (2006.01)
  *B29K 21/00* (2006.01)
  *B29L 30/00* (2006.01)

(52) U.S. Cl.
  CPC ............... *B29C 2947/9259* (2013.01); *B29C 2947/92647* (2013.01); *B29C 2947/92876* (2013.01); *B29C 2947/92923* (2013.01); *B29C 2947/92961* (2013.01); *B29K 2021/00* (2013.01); *B29L 2030/00* (2013.01)

(56) References Cited

FOREIGN PATENT DOCUMENTS

| | | |
|---|---|---|
| JP | 2006-103199 A | 4/2006 |
| JP | 2011-183698 A | 9/2011 |

* cited by examiner

APPARATUS AND METHOD FOR MANUFACTURING RAW RUBBER STRIP

This application is a Divisional of copending application Ser. No. 13/437,218, filed on Apr. 2, 2012, which claims priority under 35 U.S.C. §119(a) to Application No. 2011-127573, filed in Japan on Jun. 7, 2011, all of which are hereby expressly incorporated by reference into the present application.

BACKGROUND OF THE INVENTION

The present invention relates to an apparatus and a method for intermittently manufacturing a raw rubber strip with a steady accurate cross sectional shape.

In recent years, it is highly appreciated by the tire manufacturers to make a rubber tire component for example tread rubber, sidewall rubber, bead clinch rubber and the like by spirally winding a raw rubber strip or tape around a building drum a number of times.

In such a manufacturing method, usually the raw rubber tape is formed by a rubber extruder. The extruded raw rubber tape is supplied to the building drum through a festoon type tape accumulator or the extruded raw rubber tape is once wound around a tape reel and supplied to the building drum from the reel. The reason for this is that the consumption of the tape is intermittent in order to remove the wound rubber component from the building drum whereas the production (extruding) of the tape is continuous to make the cross sectional shape and thickness of the tape constant and stable and to prevent breakage of the tape. In either case, therefore, the installation space of the apparatus for manufacturing a rubber tire component is inevitably increased due to the accumulator or reel.

SUMMARY OF THE INVENTION

It is therefore, an object of the present invention to provide an apparatus and a method for manufacturing a raw rubber strip which can intermittently manufacture a raw rubber strip with a steady accurate cross sectional shape and accordingly can remove the need of the accumulator or reel.

According to the present invention, an apparatus for intermittently manufacturing a raw rubber strip, comprises a rubber extruder unit, a calendar unit disposed in front of the rubber extruder unit and a controller, wherein the rubber extruder unit comprises a screw extruder, an extruder head disposed at a front end of the rubber extruder unit, and a gear pump therebetween, the screw extruder comprises an extruder screw for kneading rubber materials supplied and pushing the kneaded rubber materials towards its outlet at the front end thereof, the extruder head comprises a nozzle block having a preforming nozzle for preforming the rubber extruded therefrom, the gear pump has gears and is positioned between the preforming nozzle and said outlet of the screw extruder so that, corresponding to on/off of the rotation of the gears, the rubber received from the outlet of the screw extruder is intermittently extruded from the preforming nozzle, the calendar unit comprises a calendar disposed in front of the extruder head, and a roll-gap changer, the calendar comprises a pair of calendar rolls at least one of which is driven to rotate and between which the preformed rubber extruded from the preforming nozzle is roll shaped into the row rubber strip having a finished thickness, the roll-gap changer switches between a close state in which the calendar rolls come close to each other in order to make the roll shaping and an open state in which the calendar rolls get away from each other not to make the roll shaping, the controller controls the rotation of the gears of the gear pump, the rotation of the calendar rolls of the calendar, and the switching of the roll-gap changer to let the calendar rolls in the open state prior to the stopping of the rotation of the calendar rolls.

The apparatus according the present invention may be further provided with the following optional features:

the controller lets the upper and lower calendar rolls in the close state after the starting of the rotation of the calendar roll;

the controller lets the time period t2c of a slowing-down state of the calendar rolls shorter than the time period t2g of a slowing-down state of the gear pump; and by the controller, the starting of the rotation of the calendar rolls is delayed from the starting of the rotation of the gear pump, and the starting of the slowing-down state of the calendar rolls is delayed from the starting of the slowing-down state of the gear pump.

According to the present invention, a method for intermittently manufacturing a raw rubber strip includes the use of the above-mentioned apparatus. Therefore, in the apparatus and method according to the present invention, in the state when the calendar rolls' rotation is off, the preformed rubber existing between the calendar rolls is released from the compression by the calendar rolls to prevent creep and a resultant decrease in the rubber thickness. Thus, the breakage of the rubber strip at the time of halting can be avoided, and the rubber strip can be manufactured intermittently with a steady accurate cross sectional shape.

DESCRIPTION OF THE PREFERRED EMBODIMENTS

Embodiments of the present invention will now be described in detail in conjunction with accompanying drawings.

In the drawings, an apparatus 1 for manufacturing a raw rubber strip according to the present invention is to intermittently manufacture a raw rubber strip GS.

Figure 2:
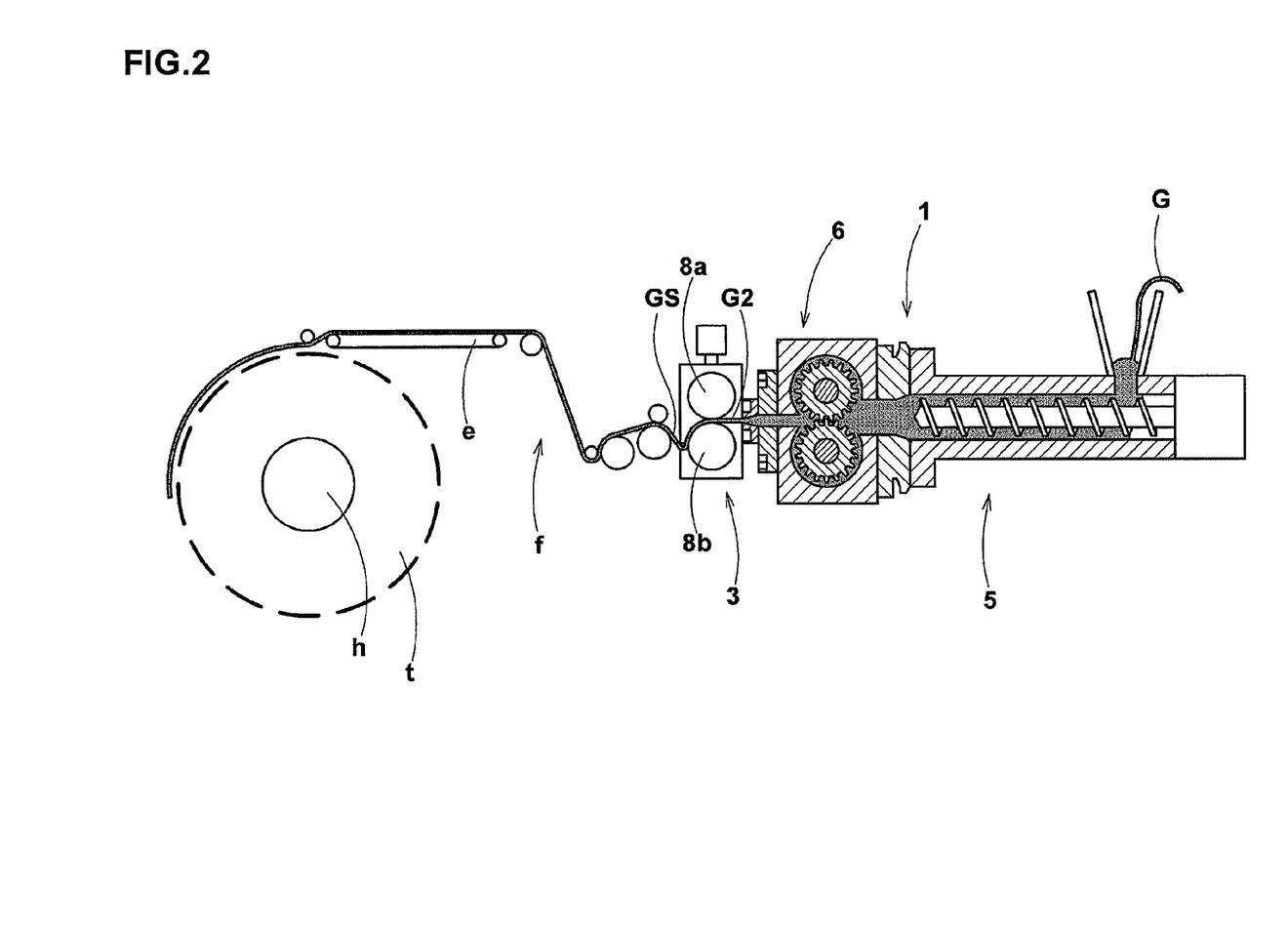
FIG. 2 is a diagram for explaining an apparatus for manufacturing a raw rubber tire component according to the present invention.

In this embodiment, the apparatus 1 for manufacturing a raw rubber strip constitutes a part of an apparatus for manufacturing rubber tire components (t) for a pneumatic tire (T) which as shown in FIG. 2 comprises: a rotatable building drum (h) around which the raw rubber strip GS is wound, and an applicator (f) for applying the raw rubber strip GS to the rotating building drum (h), the applicator (f) comprising a conveyer (e) for conveying the raw rubber strip GS from the apparatus 1 to the building drum (h). Thus, the raw rubber strip GS is wound spirally around the building drum (h) to form a rubber tire component (t).

Figure 3:
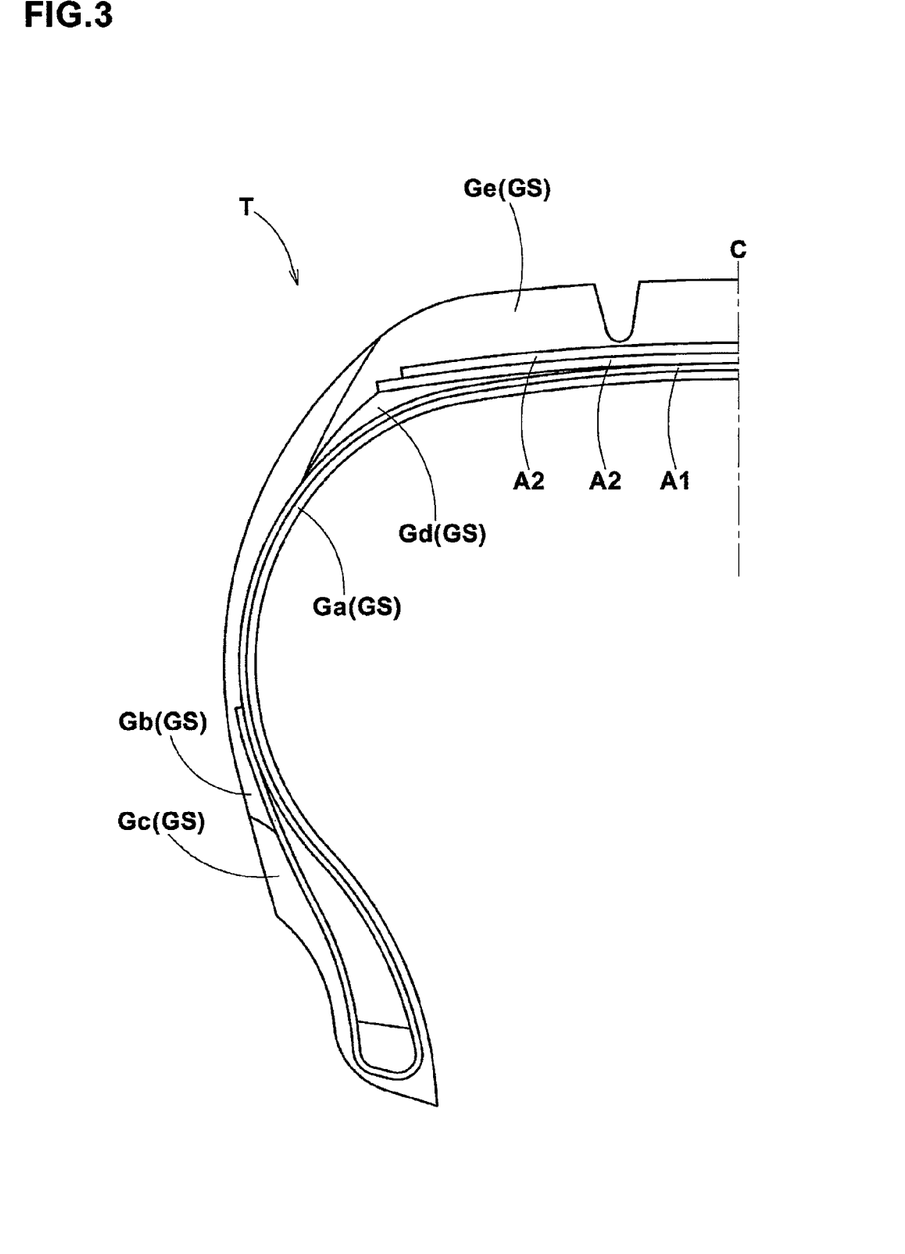
FIG. 3 is a schematic cross-sectional view of a pneumatic tire in which the raw rubber strip is wound as its rubber tire component.

The pneumatic tire (T) is, as shown in FIG. 3, made up of rubber tire components (t), e.g., inner liner rubber Ga, sidewall rubber Gb, chafer rubber Gc, breaker cushion Gd, tread rubber Ge and the like in addition to rubberized cord layers, e.g., a carcass A1, a breaker A2 and the like.

The apparatus 1 is used to manufacture a plural kinds of rubber strips (generically the "rubber strip GS") having different compositions to form the inner liner rubber Ga, sidewall rubber Gb, chafer rubber Gc and the like.

Such rubber strips GS are sequentially wound around the building drum (h) in its cylindrical state and form a cylindrical raw tire to be subjected to shaping into a toroidal shape.

During removing the raw tire (namely, the wound rubber tire components) from the building drum, the apparatus 1 needs to stop because the accumulator, reel and the like are not provided. Thus, the apparatus 1 needs to manufacture the rubber strip intermittently.

Figure 1:
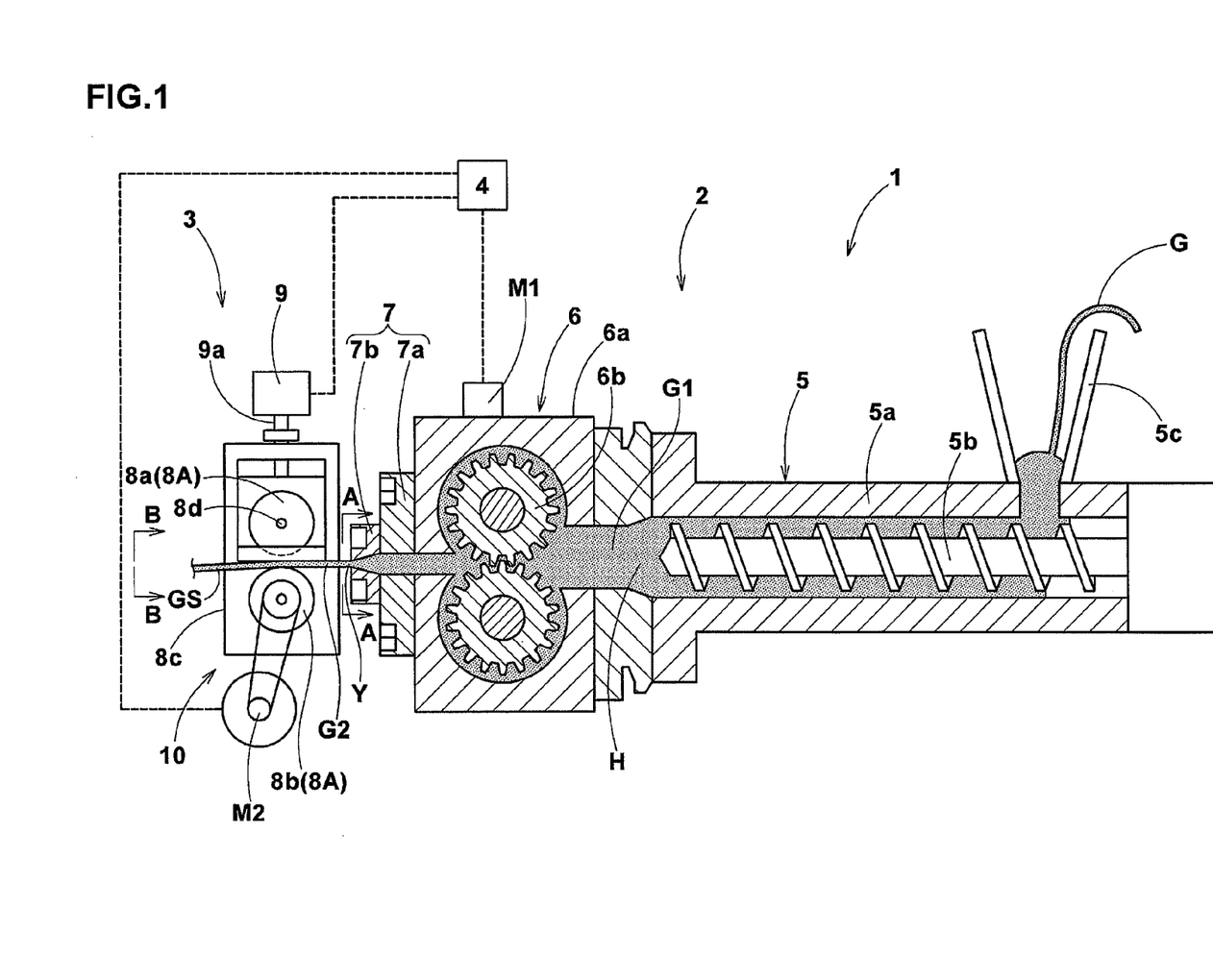
FIG. 1 is a schematic cross-sectional view of an apparatus for manufacturing a raw rubber strip according to the present invention.

As shown in FIG. 1, the apparatus 1 for manufacturing a rubber strip comprises:
  a rubber extruder unit 2 for preforming and intermittently extruding rubber G2;
  a calendar unit 3 disposed on the extruding side of the rubber extruder unit 2 and rolling the preformed extruded rubber G2 into the rubber strip GS having the finished thickness; and
  a controller 4 for controlling the rubber extruder unit 2 and the calendar unit 3 such that the apparatus 1 outputs the rubber strip GS intermittently synchronously with the cycle of need in the formation process of the rubber tire component (t).

The rubber extruder unit 2 comprises:
  an extruder 5 which kneads the supplied rubber materials G and pushes or conveys the rubber materials G towards its outlet H at the front end thereof;
  a gear pump 6 which is disposed on the front side of the extruder 5, and receives the kneaded rubber from the outlet H, and extrudes the rubber from its outlet; and
  an extruder head 7 which preforms the rubber G1 extruded from the gear pump 6.

The extruder 5 has a conventional structure in which an extruder screw 5b is disposed in a bore of a main body 5a having an inlet 5c for the rubber materials G. By turning on an electric motor (not shown) for rotating the extruder screw 5b, the supplied rubber materials G are kneaded and pushed or conveyed forward by the rotating extruder screw 5b, and extruded from the outlet H formed at the front end of the extruder main body 5a.

The gear pump 6 in this embodiment is an external gear pump having a conventional structure in which two external spur gears 6b are disposed in a casing 6a. By turning on an electric motor M1 for rotating the gears 6b, the kneaded rubber G1 received from the outlet H is extruded toward the extruder head 7 from its outlet formed at the front end of the casing 6a.

The extruder head 7 comprises:
  a block-like head main portion 7a having a through hole and interchangeably attached to the gear pump 6 on the front side thereof; and
  a nozzle block 7b interchangeably attached to the head main portion 7a and having a through hole and a preforming nozzle Y opened at the front end thereof.

The through hole of the head main portion 7a and the through hole of the nozzle block 7b constitute one through hole of which cross sectional shape gradually changes from a circle to a rectangle and finally opened at the front end of the nozzle block as the preforming nozzle Y.

Figure 4A:
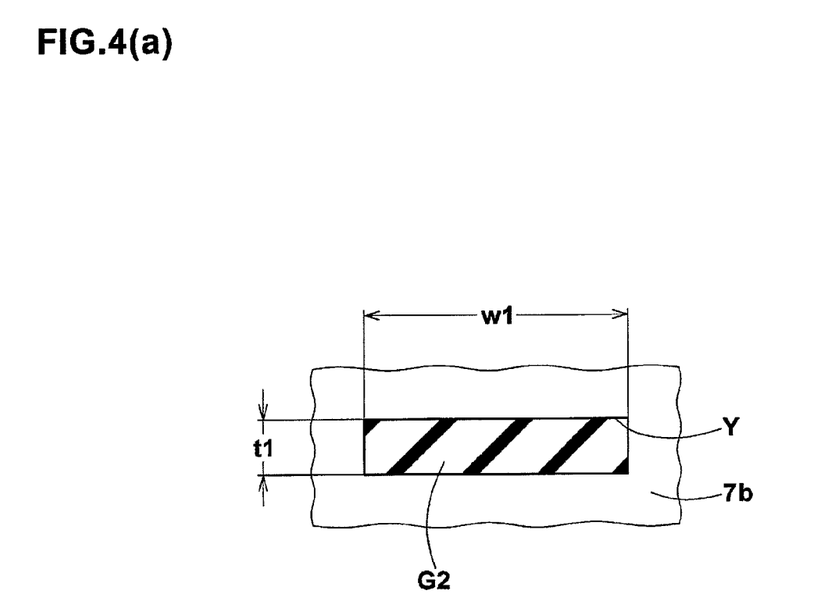
FIG. 4(a) is a cross sectional view of a raw rubber strip taken along line A-A in FIG. 1.

The opening shape of the preforming nozzle Y is a relatively-small horizontally-long rectangle as shown in FIG. 1 and FIG. 4(a). Thus, the preformed rubber G2 has a rectangular cross sectional shape which is substantially same as the opening shape of the preforming nozzle Y. Of course, it is also possible to preform the kneaded rubber G1 to have a cross-sectional shape different from a rectangle.

By the extruder head 7, the kneaded rubber G1 is preformed and extruded as the preformed rubber G2. It is not essential but preferable that the preformed rubber G2 has a thickness t1 of not less than 0.4 mm and not more than 6 mm and a width w1 of not less than 4 mm and not more than 40 mm. If the sizes are too small, it becomes difficult to maintain the shaping accuracy. If the sizes are too large, it becomes difficult to realize the desirable cross-sectional shape of the rubber component by winding the rubber strip. By employing the gear pump 6, the output power of the extruder 5 can be reduced and that of the rubber extruder unit 2 as whole is also reduced. Thus, the downsizing of the rubber extruder unit 2 is possible.

The calendar unit 3 comprises a calendar 10 and a roll-gap changer 9 as shown in FIG. 1.

The calendar 10 comprises:
  a pair of upper and lower calendar rolls 8a and 8b (generically the "calendar roll 8A");
  a main frame 8c disposed at the front end of the extruder head 7 and supporting the calendar rolls 8A therein rotatably and movably up and down while keeping the rotation axes of the calendar rolls 8A in substantially parallel with each other; and
  an electric motor M2 for rotating the calendar rolls 8A.

The calendar 10 shapes the preformed rubber G2 into the rubber strip GS during passing through between the upper and lower calendar rolls 8a and 8b.

The roll-gap changer 9 is to switch between a close state and open state of the upper and lower calendar rolls 8a and 8b. The close state is such that the upper and lower calendar rolls 8a and 8b come close to each other in order to make a roll shaping. The open state is such that the upper and lower calendar rolls 8 and 8b get away from each other not to make or stop the roll shaping.

The roll-gap changer 9 in this embodiment comprises:
  a liner actuator such as hydraulic cylinder and air cylinder having a rod 9a and fixed to the main frame 8c; and
  a bearing unit 8d attached to the end of the rod 9a of the liner actuator and rotatably supporting the upper calendar roll 8a.

The actuator is operated with fluid pressure controlled by the use of at least one regulator, e.g., solenoid valve, voltage-to-pressure (E/P) transducer and the like. By the liner motion of the rod 9a, the upper calendar roll 8a is moved up and down and switches between the close state and the open state.

Figure 4B:
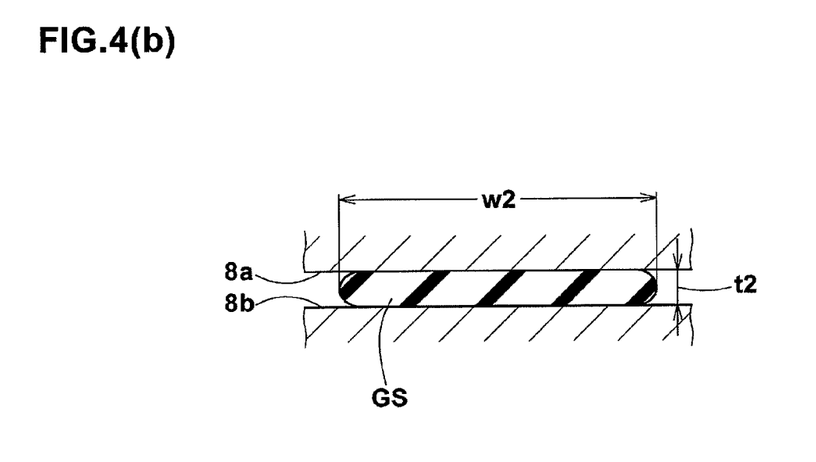
FIG. 4(b) is a cross sectional view of the raw rubber strip taken in the direction of arrows B-B in FIG. 1

It is not essential but desirable that the rubber strip GS has a thickness t2 of not less than 0.3 mm and not more than 5 mm and a width w2 of not less than 5 mm and not more than 50 mm. If the sizes are too small, there is a possibility that the rubber strip GS is broken during winding around the building drum. If the sizes are too large, it becomes difficult to realize the desirable cross-sectional shape of the rubber component by winding the rubber strip.

If the calendar rolls 8A are stopped in the close state of the calendar rolls between which the rubber strip is compressed, creep is caused and the rubber thickness is gradually decreased. As a result, the rubber is very liable to break when the apparatus restarts. Further, it is necessary to control the extruder and calendar so that the rubber strip is not subjected to a large tensile stress in order to prevent the breakage of the rubber strip.

Therefore, to solve such problems, the controller 4 controls the on/off of the operation of the gear pump 6, the on/off of the operation of the calendar rolls 8A and the close/open state of the roll-gap changer 9. For example, a programmable sequencer, a microcomputer, a personal computer or the like can be used as the controller 4.

The functions of the controller 4 are described hereinafter in conjunction with a method for manufacturing a rubber strip which uses the apparatus 1.

In the stopped state or halting state of the apparatus 1, the rubber extruder unit 2 and calendar unit 3 are also stopped, and the upper and lower calendar rolls 8a and 8b are in the open state.

In the open state, it is preferable that the rubber strip GS existing between the calendar rolls 8A is supported between the calendar rolls 8A with a very small roll pressure which cannot reduce the thickness of the rubber strip GS but can transfer the rotational force of the calendar rolls to the rubber strip GS because by rotating the calendar rolls 8A, it is possible to move the rubber strip GS forward immediately. In this application, the "open state" means such a very small roll pressure state.

For that purpose, the roll pressure between the calendar rolls 8A in the open state is preferably set in a range of 0.04 to 0.06 MPa. In order to achieve such a roll pressure value, the distance to between the upper and lower calendar rolls 8a and 8b in the open state is controlled to be less than the thickness t1 of the preformed rubber G2 and preferably not less than 150% of the distance tB between the upper and lower calendar rolls 8a and 8b in the close state.

Accordingly, in the stopped state, a part of the rubber strip GS sandwiched between the calendar rolls 8A is prevented from decreasing in the thickness. Thus, even if the calendar is stopped for a long time, the necessary thickness can be maintained, and the breakage of the rubber strip at the time of the restart can be avoided.

On the other hand, the roll pressure between the calendar rolls 8A in the close state is preferably set in a range of 0.7 to 0.9 MPa.

To start the apparatus 1 from such stopped state, the controller 4 enables the gear pump 6, the calendar 10, the roll-gap changer 9 and the extruder 5 and controls these devices as explained later to produce the rubber strip GS.

Figure 5A:
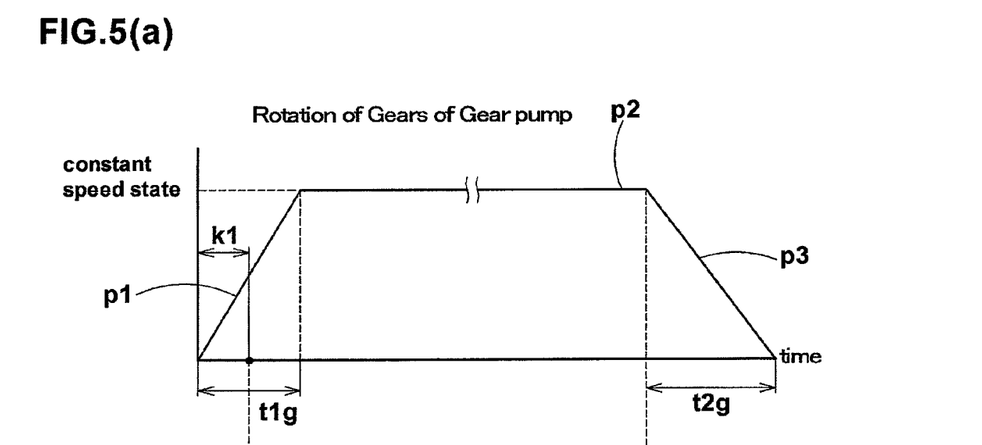
FIG. 5(a) is a graph showing rotational speed of the gears of the gear pump.
Figure 5B:
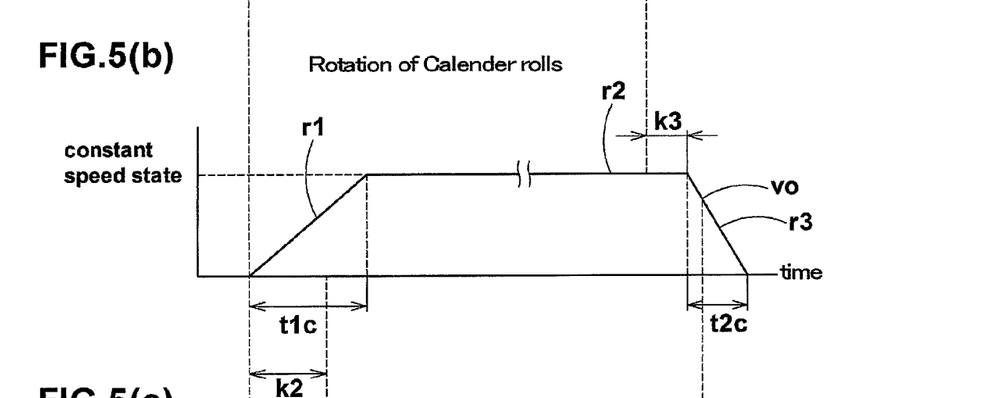
FIG. 5(b) is a graph showing rotational speed of the calendar rolls.
Figure 5C:
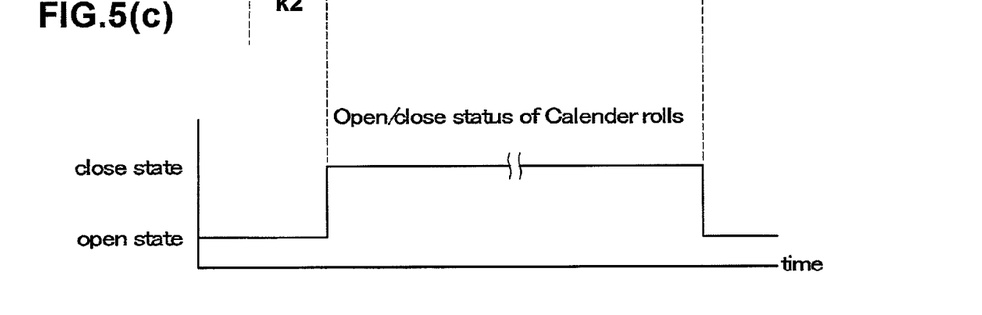
FIG. 5(c) is a graph showing the open/close state of the calendar rolls.

FIGS. 5(a), 5(b) and 5(c) shows operating states of the respective devices (gear pump 6, calendar rolls 8A) as a function of the time elapsed from the start of the rotation of the gear pump 6. Here, the axis of ordinate denotes the change in the operating state, but the coordinate does not necessarily mean the amount of change.

As shown in FIG. 5(a), the gear pump 6 has:
a constant rotating speed state P2 (namely, a steady state) where the rotating speed is constant;
an accelerating state p1 from the starting of the rotation of the gears 6b to the steady state p2; and
a slowing-down state p3 from the steady state p2 to the stopping of the rotation.

As show in FIG. 5(b), the calendar rolls 8A have:
a constant rotating speed state r2 (namely, a steady state) where the rotating speed is constant;
an accelerating state r1 from the starting of the rotation of the calendar rolls 8A to the steady state r2; and
a slowing-down state r3 from the steady state r2 to the stopping of the rotation.

In contrast, the calendar rolls 8A has only two states as show in FIG. 5(c), which are the above-mentioned close state and open state.

As shown in FIGS. 5(a) and 5(b), the gear pump accelerating state p1 is started before the starting of the calendar accelerating state r1 by the controller. In other words, the calendar accelerating state r1 starts after the starting of the gear pump accelerating state p1.

As a result, the rubber G2, which exists between the nozzle block 7b and calendar rolls 8A and is not yet successively extruded, is not subjected to a tensile force due to the rotation of the calendar rolls 8A. Therefore, the decrease in the thickness is prevented, and the breakage of the rubber G2 can be prevented.

Preferably, the time difference K1 between the starting of the gear pump accelerating state p1 and the starting of the calendar accelerating state r1 is set in a range of from 0.01 to 0.1 sec.

If the time difference K1 is large, there is a possibility that the rubber G2 can not be sent forward in good order.

In the case of the rubber strip GS made of a natural-rubber-based compound for example used to form a sidewall rubber Gb of a pneumatic tire, there is a tendency that shrink becomes relatively large. Therefore, it is preferable that the time period t1c of the accelerating state of the calendar rolls 8A is set to be more than the time period t1g of the accelerating state of the gear pump 6 by controlling the rotating speed of the electric motor(s) by the controller.

Preferably, the time period t1c of the accelerating state is set in a range of from 1.2 to 2.5 times the time period t1g of the accelerating state. This decreases the tensile stress applied to the rubber G2 existing between the nozzle block 7b and the calendar rolls 8A at the time of startup, and thereby the prevention of the breakage of the rubber G2 is further assured. Incidentally, the time period t1c of the accelerating state is determined experimentally not to cause substantial tension and looseness on the rubber G2 between the nozzle block 7b and the calendar rolls 8A, and such data is stored in the controller.

In the case of the rubber strip GS made of a synthetic-rubber-based compound for example used to form a tread rubber G of a pneumatic tire, in order to suppress the increase in the volume of the rubber when freed from the pressure of the extruder, it is desirable that the time period t1c of the accelerating state of the calendar rolls 8A is set to be less than 1.0 times the time period t1g of the accelerating state of the gear pump 6 by controlling the rotating speed of the electric motor(s) by the controller. Preferably, the time period t1c of the accelerating state is more than 0.8 times the time period t1g.

As show in FIGS. 5(b) and 5(c), it is preferred that the controller 4 lets the calendar rolls 8A in the close state when the calendar rolls are within the accelerating state r1.

In other words, the calendar rolls 8A are switched to the close state after the starting of the accelerating state r1 of the calendar rolls 8A.

As a result, when the calendar rolls 8A become in the close state, the part of the rubber strip GS sandwiched between the calendar rolls 8A in the stopped state or halting state of the calendar 10 has been moved forward. Accordingly, the sandwiched part can not be further compressed by the closing calendar rolls 8A, and thereby the breakage of the rubber strip GS is prevented.

If the time difference K2 between the starting of the rotation of the calendar rolls 8A and the switching to the close state is too long, however, the thickness of the rubber strip GS tends to increase over the desired thickness.

For this reason, the time difference K2 between the starting of the rotation of the calendar rolls 8A and the switching to the close state is preferably set in a range of from 0.01 to 0.1 sec.

To stop the apparatus, the starting of the slowing-down state r3 of the calendar rolls 8A is delayed from the starting of the slowing-down state p3 of the gear pump 6 as show in FIGS. 5(a) and 5(b).

This is because, for a certain period of time immediately after the starting of the slowing-down state p3 of the gear pump 6, the rubber is still extruded from the nozzle block 7b at the same rate as in the constant rotating speed state due to the elasticity of the rubber G2. Therefore, if the starting of the slowing-down state r3 of the calendar rolls 8A occurs at the same time as the starting of the slowing-down state p3 of the gear pump 6, then it is difficult to smoothly convey the rubber G2 onwards from the calendar rolls 8A and there is a possibility that the thickness of the rubber strip GS increases over the targeted thickness.

Preferably, the time delay of the starting of the slowing-down state r3 of the calendar rolls 8A from the starting of the slowing-down state p3 of the gear pump 6 is set to be substantially equal to the sum of the time when the extruding rate of the rubber begins to decrease measured from the starting of the slowing-down state p3 of the gear pump 6 and the time required for the extruded rubber to reach to the calendar rolls 8A. Thereby, the feeding of the rubber strip GS becomes smooth and the thickness variation can be reduced. However, if the starting of the slowing-down state r3 of the calendar rolls 8A is delayed too much from the starting of the slowing-down state p3 of the gear pump 6, the rubber G2 is subjected to a large tensile force and liable to be broken. For this reason, the time difference K3 between the starting of the slowing-down state r3 of the calendar rolls 8A and the starting of the slowing-down state p3 of the gear pump 6 is determined experimentally based on the materials of the rubber, the shape or configuration of the rubber G2 and the like, but usually it is set to be about 0.2 to 0.4 sec.

As shown in FIGS. 5(b) and 5(c), it is necessary to let the calendar rolls 8A in the open state prior to the stopping of the rotation of the calendar rolls 8A, namely, within the time period t2c of the slowing-down state r3 of the calendar rolls 8A. As a result, the creep can be prevented and the thickness of the rubber strip GS becomes stable. And at the time of stopping the apparatus 1, the rubber G2 existing between the nozzle block 7b and the calendar rolls 8A is applied by a moderate tensile stress capable of preventing the shrinkage.

In addition, it is preferable that the switching to the open state from the close state by the roll-gap changer 9 is made when the surface speed of the calendar rolls 8A is decreased down to within a range of from 50 to 150 mm/sec.

Further, as show in FIGS. 5(a) and 5(b), it is preferable that the time period t2c of the slowing-down state r3 of the calendar rolls 8A is set to be less than the time period t2g of the slowing-down state of the gear pump 6. Preferably, the time period t2c is set to be not less than 0.6 times but less than 1.0 times the time period t2g. This helps to decreases the tensile stress of the rubber G2 existing between the nozzle block 7b and the calendar rolls 8A and prevent the breakage of the rubber.

It is preferable that the stopping of the rotation of the calendar rolls 8A occurs prior to the stopping of the rotation of the gear pump 6. This further helps to prevent the breakage of the rubber.

As to the electric motors M1 and M2 for rotating the gears and calendar rolls 8A, preferably used is an electric motor driven by a variable-voltage variable-frequency generator (inverter) in order to easily change the time periods t1c and t2c of the accelerating state and slowing-down state of the calendar rolls 8A and the time periods t1g and t2g of the accelerating state and slowing-down state of the gear pump 6.

As explained above, the controller 4 program-controls the timing of the various states of the gear pump 6, calendar 10, roll-gap changer 9 and extruder 5 not to cause an excessive tensile stress on the rubber strip GS, therefore, even if the apparatus 1 intermittently manufactures the rubber strip, the breakage of the rubber is completely prevented, and further the shape or configuration of the rubber strip becomes stable. Therefore, the accuracy of the rubber component formed therefrom can be improved.

The invention claimed is:

1. A method for intermittently manufacturing a raw rubber strip by the use of an apparatus comprising a rubber extruder unit, a calendar unit disposed in front of the rubber extruder unit, and a controller, wherein the rubber extruder unit comprises a screw extruder, an extruder head disposed at a front end of the rubber extruder unit, and a gear pump therebetween, the screw extruder comprises an extruder screw for kneading rubber materials supplied and pushing the kneaded rubber materials toward its outlet at the front end thereof, the extruder head comprises a nozzle block having a preforming nozzle for preforming the rubber extruded therefrom, the gear pump has gears and is positioned between the preforming nozzle and said outlet of the screw extruder so that, corresponding to repetition of rotation and stop of gears, the rubber received from the outlet of the screw extruder is intermittently extruded from the preforming nozzle, the calendar unit comprises a calendar disposed in front of the extruder head, and a roll-gap changer, the calendar comprises a pair of calendar rolls at least one of which is driven to rotate and between which the preformed rubber extruded from the preforming nozzle is roll shaped into the raw rubber strip having a finished thickness, the roll-gap changer switches between a close state in which a gap between the calendar rolls is decreased so as to roll shape the preformed rubber, and an open state in which the gap between the calendar rolls is increased so as not to serve for the roll shaping of the preformed rubber, wherein the roll-gap changer is operated to let the calendar rolls in the open state prior to the stopping of the rotation of the calendar rolls.

2. The method according to claim 1, wherein the roll-gap changer is operated to let the calendar rolls in the close state with a time delay from the starting of rotation of the calendar rolls.

3. The method according to claim 2, wherein
the calendar rolls have: a constant rotating speed state; an accelerating state from the starting of the rotation of the calendar rolls to the constant rotating speed state; and a slowing-down state from the constant rotating speed state to the stopping of the rotation,
the gear pump has: a constant rotating speed state; an accelerating state from the starting of the rotation of the gears to the constant rotating speed state; and a slowing-down state from the constant rotating speed state to the stopping of the rotation, and
a time period $t2c$ of the slowing-down state of the calendar rolls is controlled to be shorter than a time period $t2g$ of the slowing-down state of the gear pump.

4. The method according to claim 3, wherein
the starting of the rotation of the calendar rolls is delayed from the starting of the rotation of the gear pump, and
the starting of the slowing-down state of the calendar rolls is delayed from the starting of the slowing-down state of the gear pump.

5. The method according to claim 1, wherein a roll pressure between the calendar rolls in the open state is in a range of 0.04 to 0.06 MPa.

6. The method according to claim 5, wherein a roll pressure between the calendar rolls in the closed state is in a range of 0.7 to 0.9 MPa.

* * * * *